United States Patent
Matsuo et al.

(10) Patent No.: US 7,202,886 B2
(45) Date of Patent: Apr. 10, 2007

(54) VIDEOPHONE TERMINAL

(75) Inventors: Hideaki Matsuo, Yokohama (JP);
Takahiro Makino, Yokohama (JP);
Fumihiko Yamada, Yokohama (JP);
Makoto Nishimura, Machida (JP);
Tetsu Hada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 397 days.

(21) Appl. No.: 10/803,239

(22) Filed: Mar. 18, 2004

(65) Prior Publication Data

US 2004/0201666 A1    Oct. 14, 2004

(30) Foreign Application Priority Data

Mar. 19, 2003  (JP) .................... P. 2003-075856

(51) Int. Cl.
H04N 7/14 (2006.01)

(52) U.S. Cl. .................. 348/14.02; 348/14.01; 348/14.11

(58) Field of Classification Search .. 348/14.01–14.09, 348/14.1, 14.11, 14.12, 14.13, 14.16; 379/93.17, 379/93.21, 93.23, 110.01; 382/103, 118, 382/190, 276
See application file for complete search history.

(56) References Cited

U.S. PATENT DOCUMENTS 5,491,743 A    2/1996  Shiio et al.
6,272,231 B1   8/2001  Maurer et al.
6,301,370 B1  10/2001  Steffens et al.
6,313,864 B1  11/2001  Tabata et al.
6,825,873 B2 * 11/2004 Nakamura et al. ....... 348/14.02
2002/0034245 A1  3/2002  Sethuraman et al.

FOREIGN PATENT DOCUMENTS

| EP | 1 158 801 | 11/2001 |
| EP | 1179957 A1 * | 2/2002 |
| GB | 2 378 879 | 2/2003 |
| JP | 5-153581 | 6/1996 |
| JP | 2002-511617 | 4/2002 |
| JP | 2002-511620 | 4/2002 |

* cited by examiner

*Primary Examiner*—Melur Ramakrishnaiah
(74) *Attorney, Agent, or Firm*—Pearne & Gordon LLP

(57) ABSTRACT

The present invention provides a videophone terminal by which the emotions and impressions of a user can be transmitted to and easily understood by a co-communicant. When a user performs a predetermined operation or when an audio processor identifies a predetermined keyword in the speech of the user, a picture of a virtual character is modified, or a completely different picture is displayed. To modify the picture of the virtual character, the size of each part of the face or the whole face is changed, or a pattern expressing an emotion is added thereto. And when a pending mode is released, the virtual character is recovered and displayed on the screen while a melody is played. At the end of a video conversation, in accordance with the user's selection, a picture indicating that the virtual character disappears from the screen is displayed before disconnecting the line.

6 Claims, 2 Drawing Sheets

VIDEOPHONE TERMINAL

BACKGROUND OF THE INVENTION

1. Field of the Invention

The present invention relates to a videophone terminal that can convey the emotions and impressions of a user so they can be easily understood by a co-communicant.

2. Description of the Related Art

In a videophone system constituted by a plurality of videophone terminals and a network, a picture obtained by a videophone terminal is transmitted, with speech, to the terminal of a co-communicant across a network. Therefore, while a user is conversing with a co-communicant at a remote location, the user can simultaneously watch the face of the co-communicant. And since the two can see and hear each other during their conversation, not only is the tone of voice of a co-communicant transmitted but also his or her appearance is presented visually, a more realistic and higher-level communication process can be performed.

However, since some users do not want their pictures transmitted to their co-communicants' terminals and others do not think that conversing while viewing pictures of themselves or their co-communicants is amusing, another technique has been developed whereby the feature points of individual facial features, such as eyebrows, eyes, the nose and the mouth, are extracted from a picture of a user, and based on the feature points, a virtual character that resembles the face of the user is generated and is transmitted as the personality of the user to the terminal of a co-communicant (Patent document 1: JP-A-2002-511617; and Patent document 2: JP-A-2002-511620).

According to this technique, first, a picture of a user's face (hereinafter referred to as a "face picture") is examined to identify the area that corresponds to the face of the user, and points (hereinafter referred to as "feature points") representing individual facial features, such as the eyebrows, the eyes, the nose and the mouth, are extracted from the face picture, as indicated in FIG. 1 for explaining a face picture and the individual feature points. Then, in accordance with the feature points, a virtual character resembling the face of the user is generated based on the an average face obtained by averaging the individual facial features. More specifically, differences between the extracted feature points and the feature points for an average face are calculated, the differential data are reflected on the average face, and a virtual character resembling the face of the user is generated. In FIG. 2, a virtual character that resembles the face of a user is presented.

Next, the movements of the individual feature points on the face picture of the user are tracked and are reflected on the virtual character. In this manner, since the movement of each facial feature associated with a change in the facial expression of the user interacts with the movement of each facial feature of the virtual character, the facial expression of the virtual character changes in consonance with a change in the user's facial expression. The virtual character, however, need not always resemble the face of the user, and when the movements of the feature points in the face picture of the user are reflected on a completely different virtual character, the facial expression of the virtual character may be varied as the facial expression of the user changes.

Furthermore, when all the facial features are moved in the same direction along the coordinate axis of the face picture, it can be assumed that the entire face has been moved. Therefore, any movement by the user, such as the nodding, tilting or shaking of the user's head, can be reflected on the virtual character.

As is described above, according to the conventional technique, since the movements of individual facial features associated with a change in the expression of the user interact with the movements of the facial features for the virtual character, the expression of the virtual character is changed in consonance with the expression of the user. Further, since any movement of the user's head is reflected on the virtual character, the virtual character moves the same as does the user's head while being nodded, tilted or shaken.

The conventional technique, however, merely provides for the direct reflection on a virtual character of changes in a user's facial expression and movements of the user's head, and emotions or impressions that are not accompanied by speech can not be expressed by using the facial expressions and movements of a virtual character. To transmit the emotions and impressions of the user so that they can be easily understood by a co-communicant, therefore, exaggerating changes in the user's facial expression or using representative symbols is better than merely having the virtual character directly reflect changes in the facial expression of the user. Furthermore, since the facial expressions or movements of the virtual character are more amusing by this method, the entertainment value of this method is superior.

SUMMARY OF THE INVENTION

In order to overcome the problems, it is one objective of the present invention to provide a videophone terminal that can transmit the emotions or impressions of a user so that a co-communicant can easily understand them.

To achieve this objective, according to one aspect of the present invention, a videophone terminal is provided for communicating, over a network, with a different terminal using speech and pictures, including a virtual character generated based on the face of a person, wherein, when a predetermined operation is performed using a keyboard, or when a predetermined keyword is identified in the speech of a user, a picture wherein the appearance of the virtual character has been changed, or another, predetermined picture, is transmitted to the different terminal. Therefore, emotions or impressions can be expressed that can not be explained merely by using the facial expressions and the movements of the virtual character. As a result, the emotions or the impressions of a user can be transmitted to and easily understood by a co-communicant.

According to the videophone terminal of this invention, a picture wherein the appearance of a virtual character is changed is a picture wherein the individual features of the face of a virtual character or the size of the entire face is changed, or a picture wherein a predetermined pattern is added to the virtual character. In this case, since the facial expressions and the movements of the virtual character will be more amusing, the entertainment value of video communication, for which the virtual character is used, will be increased.

Further, according to the videophone terminal of the invention, when a keyboard is used to perform a predetermined operation, a predetermined sound effect is transmitted to the different terminal, instead of, or while superimposed on the speech of the user. Therefore, the emotions or the impressions of the user that can not explained using only speech or pictures can be expressed using sounds.

According to another aspect of the invention, a videophone terminal is provided for communicating, across a network, with a different terminal using speech and pictures, including a virtual character that is generated based on the face of a person, wherein when a predetermined operation is performed for canceling a pending state when a picture other than the virtual character is transmitted, or when the face of a user used before the pending state is recognized in a picture obtained during a period in the pending state, a picture and speech are transmitted to recover and redisplay the virtual character on a screen, accompanied by a predetermined sound, and the pending state is canceled. Therefore, a co-communicant using the other terminal can visually ascertain that the screen has recovered from the pending state.

According to an additional aspect of the invention, provided is a videophone terminal, for communicating, across a network, with a different terminal by using speech and pictures, including a virtual character that is generated based on the face of a person, wherein when a predetermined operation is performed at the end of communication with the different terminal, a picture wherein the virtual character is disappearing from a screen is transmitted to the different terminal before a line is disconnected; and wherein a picture provided by a first predetermined operation differs from a picture provided by a second predetermined operation. Therefore, in accordance with the contents of the picture, the impression of a conversation engaged in by a user can be transmitted to the co-communicant.

Figure 1:
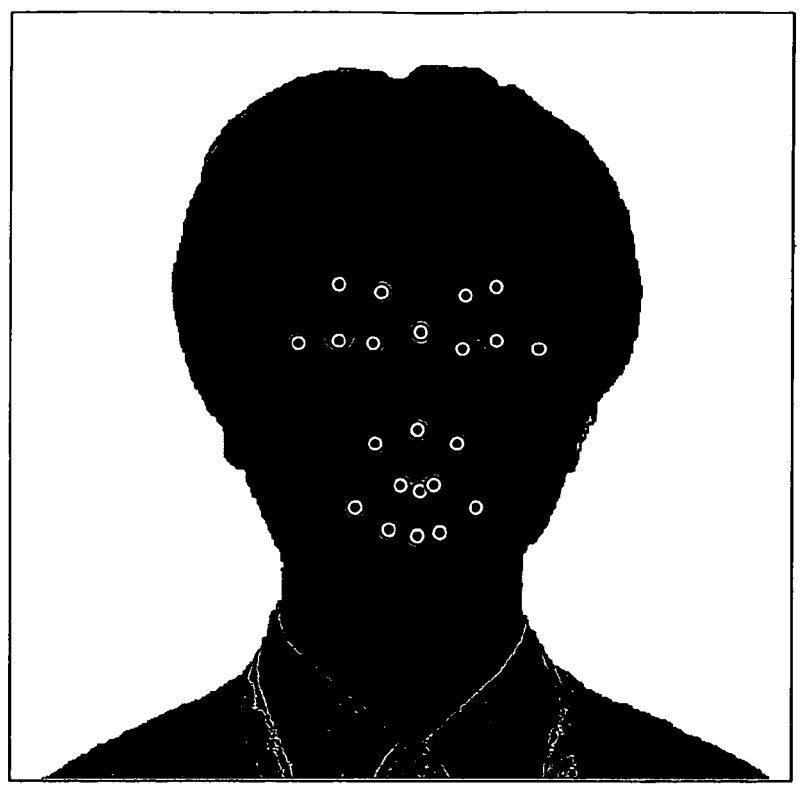
FIG. 1 is a diagram for explaining a face picture and feature points.

In the drawings, a reference numeral 101 refers to a camera; 103 to a video processor; 105 to a microphone; 107 to a loudspeaker; 109 to an audio processor; 111 to a virtual character generator; 113 to a display unit; 115 to a keyboard; 117 to a storage unit; 119 to a central processing unit; 121 to a wireless unit; and 123 to an antenna.

DETAILED DESCRIPTION OF THE PREFERRED EMBODIMENTS

A videophone according to the present invention will now be described while referring to drawings.

A videophone terminal according to one mode of this invention is a portable telephone, or a communication terminal such as a PHS or a PDA, that includes a camera for obtaining moving pictures and static pictures (both of which are hereinafter referred to simply as "pictures"). The videophone terminal can be used as a video telephone for exchanging pictures and speech, over a network, with another videophone terminal. A picture exchanged between videophone terminals during a videophone conversation may be not only be a picture obtained by a camera, but also a picture of a virtual character that is generated based on a picture of a user taken by the camera. In this mode, an example is employed wherein a picture of the virtual character is received.

The processing for generating a virtual character will now be described. The videophone terminal for this mode identifies the area of the face in a picture of a user taken by the camera. Then, points (hereinafter referred to as feature points) representing facial features, such as the eyebrows, the eyes, the nose and the mouth, are extracted from the face picture. FIG. 1 is a diagram for explaining the locations on a picture of the feature points of the individual facial features. Since the eyebrows, the eyes, the nose and the mouth, which are the main facial features, are complicatedly changed, depending on the facial expression, facial features that are moved relative to other features as an expression is changed are extracted as feature points.

Figure 2:
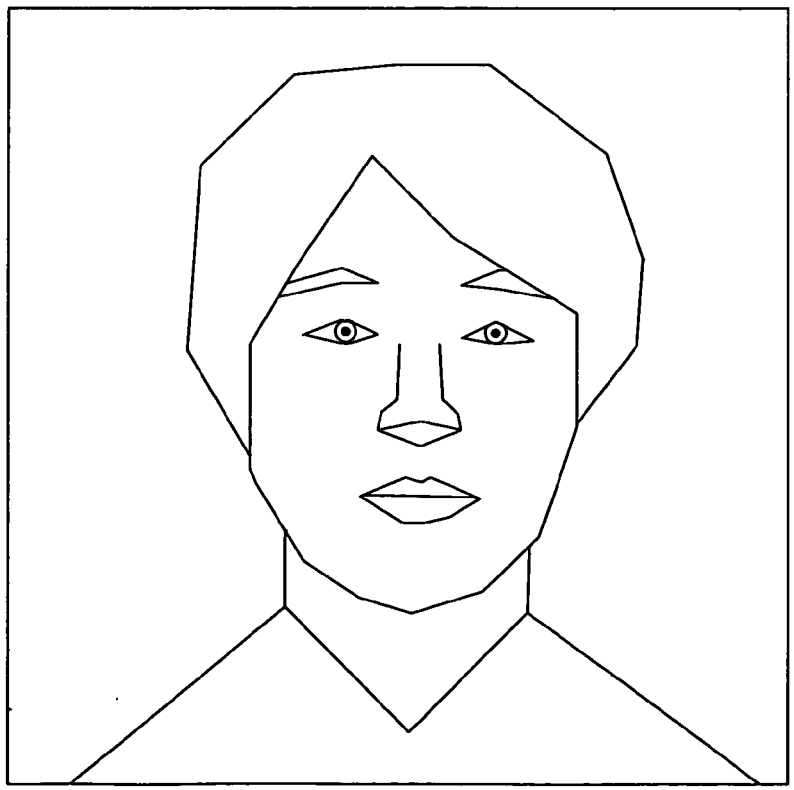
FIG. 2 is a diagram for explaining a virtual character resembling the face of a user.

Next, a virtual character, resembling the face of the user, is generated based on an average face formed by averaging the feature points corresponding to the individual facial features of the user. More specifically, differences between the extracted feature points and the feature points for the average face are calculated, and the obtained differential data are reflected on the character of the average face. In this manner, a virtual character resembling the face of the user is generated. FIG. 2 is a diagram for explaining a virtual character resembling the face of the user.

The feature points on the picture of the face of the user are tracked, and the movement of each feature in the picture is reflected on the virtual character. When all the features of the face are moved in the same direction, along the coordinate axis of the face picture, it can be assumed that the whole face is moving. Therefore, the nodding, or tilting or shaking of the head of the user can be reflected on the virtual character.

Figure 3:
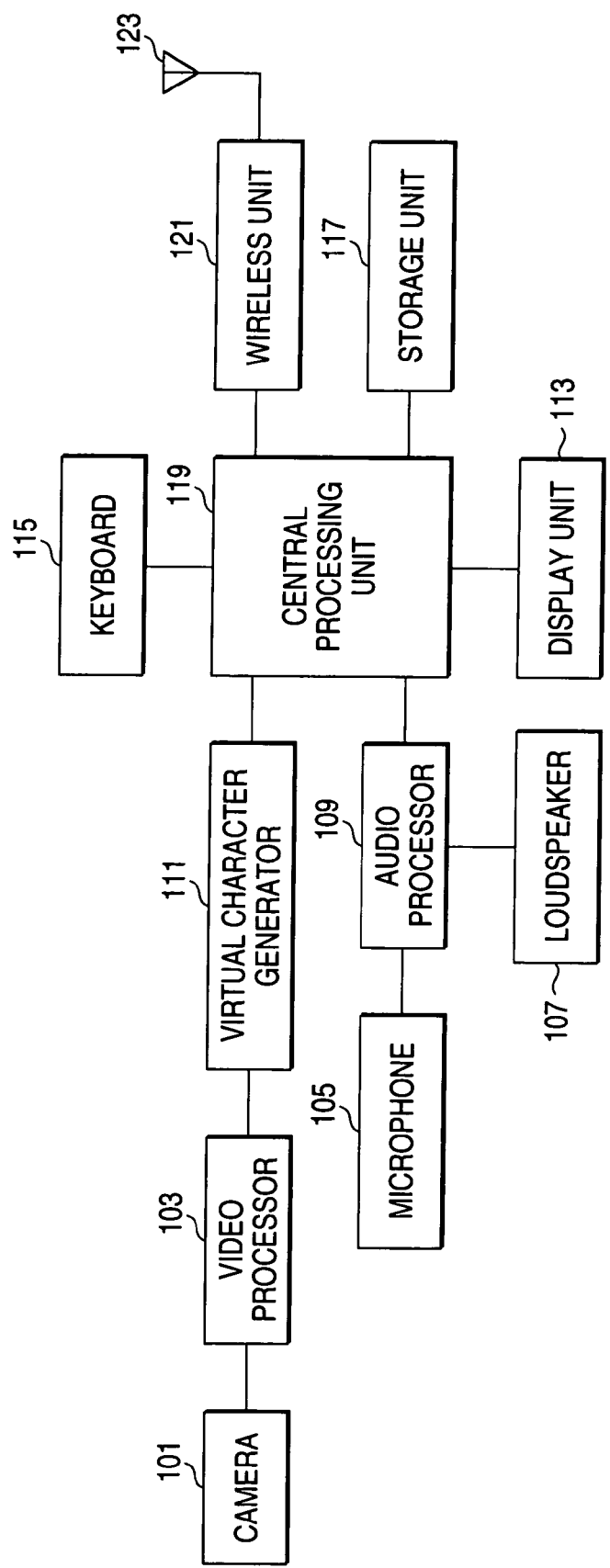
FIG. 3 is a block diagram showing the configuration of a videophone terminal according to one mode of the present invention.

The configuration of the videophone terminal for this mode will now be described while referring to FIG. 3. As is shown in FIG. 3, the videophone terminal for this mode comprises: a camera 101, a video processor 103, a microphone 105, a loudspeaker 107, an audio processor 109, a virtual character generator 111, a display unit 113, a keyboard 115, a storage unit 117, a central processing unit 119, a wireless unit 121 and an antenna 123.

The video processor 103 analyzes a picture taken by the camera 101, identifies the location of a face in the picture, and extracts feature points. The audio processor 109 performs a predetermined process for the speech of a user input through the microphone 105, or processes speech data for a co-communicant received from the co-communicant's videophone terminal, and outputs the speech through the loudspeaker 107. The processing performed by the audio processor 109 includes the analyzation of elements that are speech characteristics, such as the volume, the tone and the pitch, and this analyzation is performed both for the speech of the user and of the co-communicant.

The virtual character generator 111 generates a virtual character based on the feature points extracted by the video processor 103, and reflects, on the virtual character, the facial expressions and the movements of the user obtained by the camera 101. The virtual character generator 111 may change part or all of the virtual character in accordance with an instruction received from the central processing unit 119. Based on schedule information and date information stored in the storage unit 117, the virtual character generator 111 designates a predetermined picture as the background for the virtual character to be displayed on the display unit 113. The background changes depending on the day or the current circumstances; for example, the picture of a cake may be designated as the background for the birthday of a user, the picture of a tiered platform, carpeted in red, for dolls may be designated for March 3rd (the Girls' Doll Festival), or the picture of a carp streamer may be designated for May 5th (the Boys' Festival).

The storage unit 117 is used to store a program related to a change in the expression of the virtual character and in the movement of the virtual character, predetermined picture and speech data, and scheduling information and date information for a user.

The keyboard 115 is used to transmit, to the central processing unit 119, an instruction to shift to a pending mode that will be described later, an instruction for line disconnection, and other instructions. The central processing unit 119 performs video and audio processing in accordance with an instruction entered using the keyboard 115 or based on a keyword, predetermined processing upon the connection/disconnection of the line, and at the start/cancellation of the pending mode, and compression/decompression processing for video data and audio data. The wireless unit 121 modulates or demodulates the video and audio data, and exchanges signals via the antenna 123.

While taking the foregoing explanation into consideration, a detailed explanation will be given for the videophone terminal of the invention by describing, in order, a first embodiment, a second embodiment and a third embodiment.

[First Embodiment]

According to the first embodiment, during a video conversation using a virtual character, when a user employs the keyboard 115 in FIG. 3 to perform a predetermined operation, or when the audio processor 109 identifies a predetermined keyword in the speech of the user, a picture wherein the appearance of the virtual character is changed, or a completely different picture is provided.

To change the appearance of the virtual character, the size of each feature on the face of the virtual character, or the size of the entire face, may be changed, or a pattern that expresses an emotion may be added, e.g., vertical lines may be added to the eyes of the virtual character, or the color of the cheeks may be changed to red. Surprise can be expressed by making only the eyes of the virtual character larger than usual, and anger can be expressed by making the entire face larger than usual and turning the face red.

Available pictures that are completely different are those of an exclamation mark (!) and a question mark (?). The exclamation mark can be used to express admiration, and the question mark (?) can be used to express doubt.

As another available picture, a picture showing a thumbs-up gesture may be stored in advance in the storage unit 117 in correlation the keyword, "All-right!". Then, when the audio processor 109 identifies this keyword in the speech of the user, the central processing unit 110 can read, from the storage unit 117, the picture showing the thumbs-up gesture and display this picture instead of, or while superimposed on, the picture of the virtual character. Not only a static but also an animated picture may be used.

Likewise, predetermined sound effects can be stored in advance in the storage unit 117 in correlation with predetermined keyboard operations. When a predetermined operation is performed using the keyboard 115, the central processing unit 119 may read from the storage unit 117 data for a corresponding sound effect, and reproduce the sound instead of, or while overlapping, the speech of the user or the user's co-communicant.

As is described above, according to this embodiment, when the user performs a predetermined operation using the keyboard 115, or when the audio processor 109 identifies a predetermined keyword, a virtual character showing an expression or movement that differs from the usual, or a completely different picture is displayed. Therefore, an emotion or an impression can be conveyed that can not be conveyed by using only the facial expression and movement of the virtual character. In this case, although the facial expression and the movement of the virtual character are themselves very amusing, the entertainment provided by video communication that uses the virtual character can be especially enhanced. In addition, since in accordance with the keyboard operation predetermined sound effects can be reproduced, an emotion or an impression of the user can be conveyed that can not be conveyed by using only speech and the picture.

[Second Embodiment]

According to the second embodiment, during a video conversation for which the virtual character is used, the operating mode may be shifted to a pending mode, and when the pending mode is canceled, the virtual character is recovered and redisplayed on a screen, accompanied by the playing of a melody. This occurs when the user, while the operating mode is the pending mode, depresses the pending mode button on the keyboard 115 in FIG. 3, and the central processing unit 119 detects this depression and cancels the pending mode. Or when feature points, which are extracted by the video processor 103 from a picture obtained by the camera 101 in the pending mode, correspond to those of the user who was engaged in a conversation before the pending mode was entered, and the central processing unit 109 cancels the pending mode.

At this time, the central processing unit 119 executes a predetermined program, reads predetermined melody data from the storage unit 117, and while playing a melody, displays the virtual character that was displayed before the pending mode was entered. It should be noted, however, that a specific period of time is required, following the cancellation of the pending mode, before the virtual character can actually be displayed because, based on the feature points that are extracted by the video processor 103 from the picture obtained by the camera 101, the virtual character generator 111 must reflect the expression and the movement of the user on the virtual character. Therefore, the picture displayed on the screen during this waiting period is the picture of the virtual character with the same expression that shows a predetermined movement together, accompanied by a melody. An example predetermined movement is one wherein the virtual character opens a door and enters a room.

As is described above, according to this embodiment, when the pending mode is canceled, a picture is displayed wherein the virtual character performs a predetermined movement accompanied by a predetermined melody, the user's co-communicant can visually apprehend that the operating mode has recovered from the pending state.

[Third Embodiment]

According to the third embodiment, at the end of a video conversation using the virtual character, a predetermined picture wherein the virtual character disappears from the screen is displayed in accordance with a button selected by the user on the keyboard 115 in FIG. 3, and the line is disconnected. An example predetermined picture is a picture wherein the virtual character disappears from the screen while holding flowers, or a picture wherein the virtual character is crushed by pressure applied to its head.

It should be noted that the impression provided the user's co-communicant differs depending on the contents of the picture. Therefore, if the user has enjoyed the conversation, at the end of the conversation, the user may depress a predetermined button that presents a picture wherein the virtual character disappears from the screen while holding flowers. On the other hand, if the user has no special reaction to the conversation, at the end of the conversation, the user may depress another button that presents a picture wherein the virtual character is crushed by pressure applied to its head. When at the end of the conversation a predetermined button is depressed in this manner, the central processing unit 119, before the line is disconnected, reads from the storage unit 117 and transmits data for a picture corresponding to the depressed button.

As is described above, according to this embodiment, at the end of a conversation a picture is displayed in consonance with the depression of a button, and using the contents of the picture, the impression the user received from the conversation is transmitted to the co-communicant.

For each of the embodiments, the video processor 103, the audio processor 109, the virtual character generator 111 and the central processing unit 119 of the videophone terminal may be operated by the execution of programs.

As is described above, according to the videophone terminal of the invention, the emotions and impressions of a user can be transmitted to and easily understood by a co-communicant.

What is claimed is:

1. A videophone terminal for communicating with other terminals over a network by using speech and pictures including a virtual character generated based on the face of a person, said video phone terminal comprising:
   a video processor for analyzing a picture obtained by a camera, identifying a location of a face in the picture, and extracting feature points of the face;
   an audio processor for analyzing audio obtained from a microphone, and processing the audio; and
   a virtual character generator for generating a virtual character based on the extracted feature points,
   wherein, when a predetermined operation is performed using a keyboard or when said audio processor identifies a predetermined keyword in the speech of a user,
   1) said virtual character generator generates a modified picture of the virtual character or generates a predetermined picture, and then,
   2) the generated picture is transmitted to the other terminal.

2. The videophone terminal according to claim 1,
   wherein said modified picture of the virtual character is generated by:
   changing a size of the whole face of the virtual character or each part of the face of the virtual character, or
   drawing a predetermined pattern on the virtual character.

3. The videophone terminal according to claim 1,
   wherein, when a predetermined operation is performed by using the keyboard,
   said audio processor generates audio data by replacing the speech of the user by a predetermined sound effect, or superimposing the predetermined sound effect on the speech of the user, and then
   said generated audio data is transmitted to the other terminal.

4. The videophone terminal according to claim 2,
   wherein, when a predetermined operation is performed by using the keyboard,
   said audio processor generates audio data by replacing the speech of the user by a predetermined sound effect, or superimposing the predetermined sound effect on the speech of the user, and then
   said generated audio data is transmitted to the other terminal.

5. A videophone terminal for communicating with other terminals over a network by using speech and pictures including a virtual character generated based on the face of a person, said videophone terminal comprising:
   a video processor for analyzing a picture obtained by a camera, identifying a location of a face in the picture, and extracting feature points of the face;
   an audio processor for analyzing audio obtained from a microphone and processing the audio; and
   a virtual character generator for generating a virtual character based on the extracted feature pointes,
   wherein, when a predetermined operation is performed for releasing a pending state by using a keyboard or when a face of an user operating the videophone before the pending state is recognized from a face obtained during the pending state by matching the feature points of both faces,
   1) said virtual character generator generates a picture indicating that said virtual character comes back on a screen and said audio processor generates a predetermined sound,
   2) the generated picture and the predetermined sound are transmitted to the other terminal, and then,
   3) the pending state is released.

6. A videophone terminal for communicating with other terminals over a network by using speech and pictures including a virtual character generated based on the face of a person, said videophone terminal comprising:
   a video processor for analyzing a picture obtained by a camera, identifying a location of a face in the picture, and extracting feature points of the face;
   an audio processor for analyzing audio obtained from a microphone and processing the audio; and
   a virtual character generator for generating a virtual character based on the extracted feature points,
   wherein, when a predetermined operation is performed at the end of communication with the other terminal, said virtual character generator generates a picture indicating that the virtual character is disappearing from a screen and the generated picture is transmitted to the other terminal before a line is disconnected, and
   wherein plural types of the picture indicating that the virtual character is disappearing from a screen are capable of being generated in accordance with the predetermined operation selected by the user.

* * * * *